3,836,674
COMPOSITION AND METHOD FOR STABILIZING TRANS-DIETHYLSTILBESTROL
Richard W. Griscom and James J. Brader, Jr., Morristown, Tenn., assignors to Chemetron Corporation, Chicago, Ill.
No Drawing. Continuation-in-part of abandoned application Ser. No. 119,929, Mar. 1, 1971. This application June 25, 1973, Ser. No. 372,999
Int. Cl. A61k 17/06, 27/00
U.S. Cl. 424—346
15 Claims

ABSTRACT OF THE DISCLOSURE

In an environment in which isomerism occurs, diethylstilbestrol is stabilized in the active trans form by the presence of a stabilizing quantity of a compound of the formula:

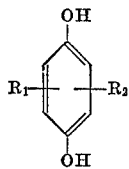

wherein $R_1$ is hydrogen or a tertiary loweralkyl group and $R_2$ is a tertiary loweralkyl group.

RELATED APPLICATIONS

This application is a continuation-in-part of Ser. No. 119,929, filed on Mar. 1, 1971, now abandoned.

BACKGROUND OF THE INVENTION

Diethylstilbestrol (DES) is a hormonal substance which may be represented in the trans isomeric configuration by the formula:

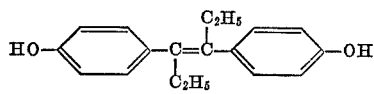

When administered to animals, particularly cattle and sheep, it promotes their growth and increases the efficiency with which they convert feed into protein. Administration may be accomplished in various ways, one of the more popular being by the oral route wherein carefully determined quantities are administered as a feed supplement in admixture with the animal's regular ration. Alternatively, administration may be by means of an implant which is placed within the animal's body and releases hormone at a controlled rate to provide an adequate dose.

In the course of administering the hormone as a feed supplement, commercial practice includes the preparation of a feed additive in which the pure drug is mixed with a liquid or solid substrate to provide a drug concentrate. The concentrate is distributed in a liquid or solid carrier and sold as a premix. The premix may remain in the channels of trade for several weeks, or even months, before incorporation into a ration which is supplied to an animal. During this period when the premix is being distributed from the manufacturer to the feed lot operator, undesirable loss of hormone activity can occur, the extent of the loss being dependent on the nature of the particular environment. The composition of the substrate and the carrier, the time, the temperature and other variables are influencing factors.

Loss of activity may be due to chemical reaction, by which the composition of the diethylstilbestrol molecule is altered, or by a change in molecular geometry, that is, by isomerization. A change in molecular composition may be determined by spectrophotometric analysis according to techniques known to those skilled in the art. Determination of isomeric configuration may be effected by other instrumental methods.

According to one procedure for establishing the ratio of the isomers the diethylstilbestrol is extracted from its environment with diethyl ether, which extracting solvent does not disturb the trans-cis relationship then existing. The ether extract is dried and converted to a trimethylsilyl ether with trimethylchlorosilane which fixes and stabilizes the trans-cis relationship. The diethylstilbestrol silyl derivatives thus obtained are separated and identified by gas-liquid chromatography techniques. The cis isomer has a lower boiling point and elutes first; it is followed by the trans diethylstilbestrol trimethylsilyl ether. A ratio of the quantities of trans and cis isomers can be obtained by computation from the areas of the peaks. The GLC chromatograms may also show peaks other than cis and trans diethylstilbestrol. In the chromatogram of the trisilyl ethers, the cis-pseudo diethylstilbestrol peak, when present, appears between the cis and trans diethylstilbestrol peaks. The trans-pseudo diethylstilbestrol, when present, appears in the tail of the trans diethylstilbestrol peak. The total diethylstilbestrol present in the various premixes can be determined quantitatively by measurement of total peak area.

Diethylstilbestrol is generally considered to be stable (R. C. Wornick, Feedstuffs, Nov. 30, 1968, page 25, 31) but investigators who worked with dilute aqueous solutions, that is, those containing one to one hundred micrograms per milliliter, reported a loss of activity during storage for several weeks. Smaller losses were reported for more concentrated solutions. It was concluded that the instability was due in part of oxidation and the addition of quantity of hydroquinone equal to or greater than the amount of diethylstilbestrol achieved some stabilization, but only after about 50% of the hormonal activity had been lost. Oily solutions which retained 87% of their activity after thirty-two weeks were considered stable (Smith and Williams, J. Endocrinology 5, 152–157 (1947)).

Quite apart from the degradation of diethylstilbestrol by oxidation, it now appears that loss of activity may occur at the concentrations of diethylstilbestrol employed in feed premixes and that isomerization is involved. It is reported (Walton and Brownlee, Nature 151, 305 (1943)) that the trans form possesses enhanced hormonal activity. Fortunately, the pure drug is readily obtained as the trans form and the concentrated pure drug appears not to rearrange to the less active cis isomer. Recently, however, it has been learned that in some admixtures, the diethylstilbestrol assumes the inactive cis configuration to a measurable extent. The rate and degree of this transformation is affected by hormone concentration, and the nature of the substrate or solvent, each environment seeming to establish a characteristic trans-cis ratio.

Ludwig teaches in U.S. 3,666,865 that the combination of a phenolic antioxidant compound and a nitrogen compound or a base or basic salt inhibits the isomerization. The data presented in the '865 patent shows that the premixes containing the phenolic antioxidant compounds taught therein as the sole stabilizing additive are only slightly better and, in some cases no better, than premixes containing no stabilizer.

There remains, therefore, a need for a simple composition and method which will provide the more active trans isomer of diethylstilbestrol in a stabilizing environment. Desirably the stabilized composition may be useful as a source of hormone for administration as an implant, as a feed supplement and the like.

THE INVENTION

This invention is based in part upon the discovery that diethylstilbestrol (DES) is stabilized in the more active trans form by the presence, as the sole stabilizer, of an effective amount of a compound of the formula:

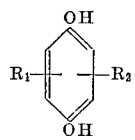

wherein $R_1$ is hydrogen or a tertiary loweralkyl group and $R_2$ is a tertiary loweralkyl group. The tertiary loweralkyl groups have from four to seven carbon atoms. In a preferred embodiment both $R_1$ and $R_2$ are tertiary loweralkyl groups having four or five carbon atoms. The compound may be a pure substance or a mixture of isomers.

As used herein the term diethylstilbestrol (DES) is intended to include diethylstilbestrol and its derivatives, especially organic esters such as the propionate and palmitate. Also included are esters with mineral acids such as phosphoric and sulfuric acids. The diethylstilbestrol must be initially in the trans form when the stabilizer is added as the compound will not effect reversion of cis diethylstilbestrol to trans diethylstilbestrol. Mixing the stabilizer with the substrate or carrier and then adding the diethylstilbestrol is an effective way to prepare a premix in which the trans diethylstilbestrol is stabilized.

The compound is associated with the trans diethylstilbestrol in a stabilizing quantity and accompanies the diethylstilbestrol in a food concentrate premix or formulated feed. It may also accompany the drug when it is administered by some other suitable route.

Liquid or solid ingredients may be employed as a substrate. Soybean meal and vegetable oils such as soybean oil and corn oil are examples of suitable materials; polyethylene glycol 200 is a preferred substrate.

The concentration of diethylstilbestrol on the substrate and in the premix may range from about 0.1% to about 20% by weight and preferably from about 4% to about 15% by weight. In a vegetable oil the amount may be from about 2% to about 5% by weight. The effective amount of stabilizer is from about 0.05% to about 10% by weight of the premix and from about 5% to about 50% by weight of the diethylstilbestrol. In a preferred formula, the stabilizer may amount to from about 10% to about 40% by weight of the diethylstilbestrol.

The premix is added to an animal feedstuff which may be a mixture of ingredients and may include vitamin and mineral supplements. It is thoroughly mixed to provide a quantity of diethylstilbestrol which may amount to from about 0.4 mg. per pound of feed (0.00009%) or somewhat less to about 20 mg. per pound of feed (0.0044%) or more.

Compositions within the scope of this invention are illustrated by the following examples which are not intended to be limiting.

EXAMPLE I

A premix concentrate is prepared by thoroughly mixing one gram of a stabilizer of formula I or II with 90.2 grams of polyethylene glycol 200 (i.e., its average molecular weight is approximately 200). To this composition is added diethylstilbestrol (DES) in the amount of 8.8 grams. The order of addition is important and the stabilizer must first be added to the substrate so that the diethylstilbestrol contacts the polyethylene glycol 200 only in the presence of the stabilizer. The mixture is analysed at once by gas-liquid chromatographic methods for trans isomer content and at intervals of several days thereafter during storage at ambient temperature. Both trans and cis isomers are determined from the ratio of chromatograph peaks. No other peaks for DES (showing, e.g., oxidation products) are found. Results obtained are shown in Table I.

TABLE I

[8.8% wt. trans-DES in polyethylene glycol 200]

| Stabilizer (1% by wt.) | Age of mixture (days) | Percent Trans |
|---|---|---|
| t-Butyl hydroquinone | 0 | 100.0 |
|  | 8 | 99.4 |
|  | 36 | 96.4 |
|  | 63 | 91.4 |
|  | 106 | 88.2 |
| di-t-Amyl hydroquinone | 1 | 99.8 |
|  | 15 | 99.6 |
|  | 69 | 99.2 |
|  | 96 | 98.1 |
|  | 140 | 97.9 |
| di-t-Butyl hydroquinone | 3 | 100.0 |
|  | 71 | 96.7 |

In a control run, after storage at ambient temperature for one day, only 82.7 percent of the trans form of the diethylstilbestrol remained in a premix concentrate prepared in the same manner as in Example I but without the stabilizer.

From the data presented above it is clear that compounds of this invention have stabilized the DES as its trans isomer and that di-t-amyl hydroquinone provides stability for the longest term. At higher concentrations the other stabilizing compounds appearing in Table I provide a high percentage of trans isomer for increased lengths of time. The compounds of this invention are thus shown to be very effective in the absence of other additives taught in the art to be necessary for long term stabilization of trans-diethylstilbestrol.

EXAMPLE II

In a similar manner, a concentrate is prepared by adding 2.2 grams of trans diethylstilbestrol to a previously mixed composition containing 96.8 grams of refined soybean oil and one gram of stabilizer. Results are shown in Table II.

TABLE II

| Stabilizer (1% by wt.) | Age of mixture (days) | Percent Trans |
|---|---|---|
| di-t-Amyl hydroquinone | 0 | 100 |
|  | 21 | 99.9 |
|  | 84 | 99.6 |

EXAMPLE III

A premix was prepared by adding sufficient concentrate (17.8% DES) to provide 0.44 grams of trans diethylstilbestrol to a previously mixed composition of 99.3 grams of carrier (92.3 grams soybean millrun, 5.0 grams soybean meal, and 2.0 grams degummed soybean oil) and 0.25 grams of stabilizer. The premix was stored at room temperature and its trans isomer content determined after an extended period. Results are shown in Table III.

TABLE III 0.44% trans-DES on soybean meal- soybean millrun- soybean oil substrate

| Stabilizer (1% by wt.) | Age of mixture (days) | Percent Trans |
|---|---|---|
| di-t-Amyl hydroquinone | 0 | 100.0 |
|  | 21 | 99.1 |
|  | 55 | 99.6 |
|  | 79 | 99.4 |
|  | 114 | 99.4 |

In this Example the ratio of stabilizer to trans diethylstilbestrol is higher than in Example I and the increased stability imparted to the product is apparent.

From the foregoing description and examples it is believed than one skilled in the art is able to use the invention to the fullest extent.

We claim:
1. A composition consisting essentially of the trans isomer of diethylstilbestrol and an effective stabilizing amount of a compound of the formula:

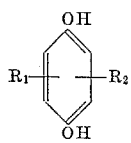

wherein $R_1$ is hydrogen or a tertiary loweralkyl group and $R_2$ is a tertiary loweralkyl group.

2. The composition according to claim 1 wherein $R_1$ and $R_2$ are tertiary loweralkyl groups.

3. The composition according to claim 1 including a carrier for the diethylstilbestrol and the stabilizing compound.

4. The composition according to claim 1 wherein the compound is present in an amount of from about 5% to about 50% by weight based on the weight of the diethylstilbestrol.

5. The composition according to claim 2 wherein $R_1$ and $R_2$ have four or five carbon atoms.

6. An animal feed additive consisting essentially of a feedstuff and a composition according to claim 3.

7. The composition according to claim 3 wherein the carrier is polyethylene glycol 200, the quantity of diethylstilbestrol is from about 4 to about 15% by weight and the stabilizing compound is ditertiary amyl hydroquinone which is present in the amount of about 1% by weight.

8. The composition according to claim 3 wherein the amount of stabilizer is from about 0.05% to about 10% by weight of the total weight of the composition.

9. The composition according to claim 3 wherein the quantity of diethylstilbestrol is equal to from about 0.1% to about 20% by weight and the amount of stabilizer compound is equal to from about 5% to about 50% of the weight of the diethylstilbestrol.

10. The composition according to claim 3 wherein the carrier is a vegetable oil and the quantity of diethylstilbestrol is about 2 to about 5% by weight.

11. The composition according to claim 3 wherein the carrier is a feedstuff and the quantity of diethylstilbestrol is about 0.44% and the quantity of stabilizer is 0.25% by weight.

12. A composition according to claim 1 containing a feedstuff mixture, diethylstilbestrol in an amount of from about 0.00009 to about 0.0044% by weight and the stabilizing compound in an amount of from about 0.000004 to about 0.0022% by weight of the total weight of the composition.

13. A composition according to claim 3 containing a feedstuff mixture, diethylstilbestrol in an amount of from about 0.00009 to about 0.0044% by weight and the stabilizing compound in an amount of from about 0.000004 to about 0.0022% by weight of the total weight of the composition.

14. A composition according to claim 5 containing a feedstuff mixture, diethylstilbestrol in an amount of from about 0.00009 to about 0.0044% by weight and the stabilizing compound in an amount of from about 0.000004 to about 0.0022% by weight of the total weight of the composition.

15. A method of stabilizing diethylstilbestrol in its trans isomer form which consists essentially of the steps of providing diethylstilbestrol in the trans configuration and adding to said isomer an effective amount of a compound of the formula:

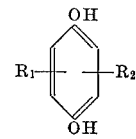

wherein $R_1$ is hydrogen or a tertiary loweralkyl group and $R_2$ is a tertiary loweralkyl group.

References Cited
UNITED STATES PATENTS 3,666,865   5/1972   Ludwig _____ 424—346

SAM ROSEN, Primary Examiner